United States Patent
Yoneda et al.

(10) Patent No.: US 7,526,567 B2
(45) Date of Patent: *Apr. 28, 2009

(54) DATA STREAM-DISTRIBUTION SYSTEM AND METHOD THEREFOR

(75) Inventors: Michiaki Yoneda, Kanagawa (JP); Masataka Yoritate, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/012,890

(22) Filed: Feb. 6, 2008

(65) Prior Publication Data

US 2008/0147874 A1    Jun. 19, 2008

Related U.S. Application Data

(63) Continuation of application No. 10/382,074, filed on Mar. 5, 2003, now Pat. No. 7,330,901.

(30) Foreign Application Priority Data

Mar. 5, 2002    (JP)    ............................. 2002-059130

(51) Int. Cl.
    *G06F 15/16*    (2006.01)

(52) U.S. Cl. ...................... 709/231; 709/224; 709/247
(58) Field of Classification Search ................. 709/231, 709/232, 201, 224, 246, 247
    See application file for complete search history.

(56) References Cited

U.S. PATENT DOCUMENTS

| 5,654,990 | A |   | 8/1997 | Jones, Jr. |
| 5,673,206 | A |   | 9/1997 | Jones, Jr. |
| 5,854,887 | A |   | 12/1998 | Kindell et al. |
| 5,920,701 | A | * | 7/1999 | Miller et al. ................. 709/228 |
| 5,928,330 | A |   | 7/1999 | Goetz et al. |
| 5,928,331 | A |   | 7/1999 | Bushmitch |
| 5,983,278 | A |   | 11/1999 | Chong et al. |
| 5,996,015 | A | * | 11/1999 | Day et al. .................... 709/231 |
| 6,101,547 | A |   | 8/2000 | Mukherjee et al. |
| 6,223,221 | B1 | * | 4/2001 | Kunz ........................... 709/224 |
| 6,377,996 | B1 |   | 4/2002 | Lumelsky et al. |

(Continued)

FOREIGN PATENT DOCUMENTS

EP    0896472 A2    5/1999

(Continued)

*Primary Examiner*—Philip B Tran
(74) *Attorney, Agent, or Firm*—Wolf, Greenfield & Sacks, P.C.

(57) ABSTRACT

A mutual recognition process is performed in step S1. When it is determined in step S2 that a request for sending a list of musical pieces has been received, the list of musical pieces is sent in step S3. When a request for sending audio data has been received in step S4, a transfer-rate measurement process is executed in step S5. When it is determined according to the transfer rate in step S6 that the audio can be transmitted, the corresponding compressed audio data is extracted in step S7, the compressed audio data is decoded to generate linear PCM data suited to the transfer rate in step S8, and transmitted in step S9. When the audio data cannot be transmitted, an error message is transmitted in step S10. The present invention can be applied, for example, to a server for distributing audio data and an audio player terminal for reproducing the distributed audio data.

17 Claims, 7 Drawing Sheets

U.S. PATENT DOCUMENTS

| | | |
|---|---|---|
| 6,407,680 B1 | 6/2002 | Lai et al. |
| 6,496,868 B2 | 12/2002 | Krueger et al. |
| 6,625,656 B2 | 9/2003 | Goldhor et al. |
| 6,708,213 B1 * | 3/2004 | Bommaiah et al. .......... 709/231 |
| 6,757,735 B2 | 6/2004 | Apostolopoulos et al. |
| 6,760,765 B1 | 7/2004 | Asai et al. |
| 7,016,970 B2 | 3/2006 | Harumoto et al. |
| 7,047,309 B2 | 5/2006 | Baumann et al. |
| 7,213,075 B2 * | 5/2007 | Feig ........................... 709/231 |
| 7,219,145 B2 * | 5/2007 | Chmaytelli et al. ......... 709/224 |
| 7,330,901 B2 * | 2/2008 | Yoneda et al. ............... 709/231 |
| 2001/0047517 A1 | 11/2001 | Christopoulos et al. |
| 2001/0049728 A1 | 12/2001 | Kang |
| 2002/0038359 A1 | 3/2002 | Ihara et al. |
| 2002/0091848 A1 | 7/2002 | Agresta et al. |
| 2002/0144276 A1 | 10/2002 | Radford et al. |
| 2003/0198184 A1 * | 10/2003 | Huang et al. ................. 370/231 |

FOREIGN PATENT DOCUMENTS

| | | |
|---|---|---|
| EP | 1026872 A1 | 8/2000 |
| JP | 07-212241 | 8/1995 |
| JP | 11-331248 | 11/1999 |
| JP | 11-331305 | 11/1999 |
| WO | WO 01/13277 A2 | 2/2001 |

* cited by examiner

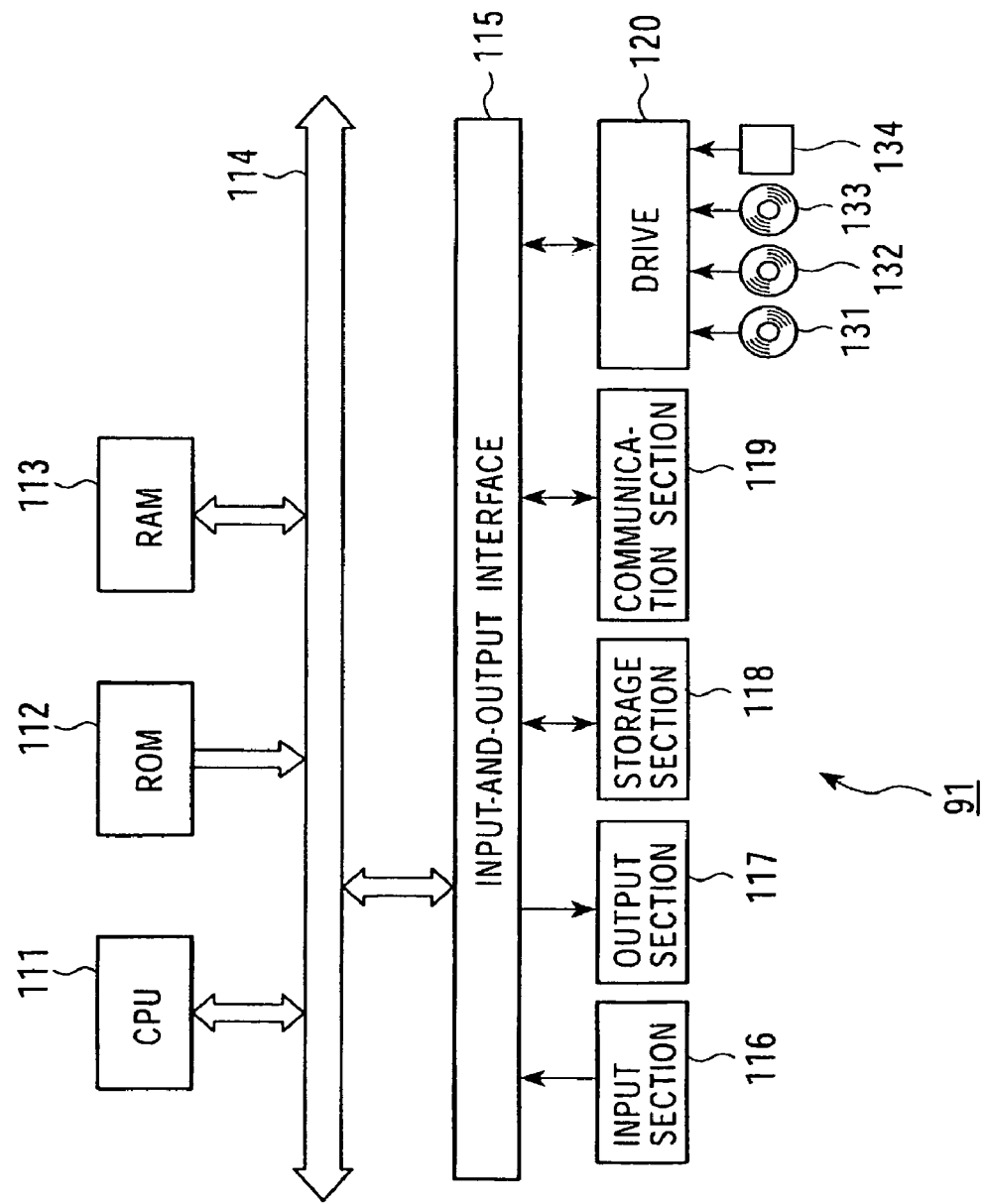

DATA STREAM-DISTRIBUTION SYSTEM AND METHOD THEREFOR

CROSS REFERENCES TO RELATED APPLICATIONS

This application is a Continuation of U.S. application Ser. No. 10/382,074, filed Mar. 5, 2003, which, in turn, claims priority under 35 U.S.C. §119 to Japanese Patent Application No. JP 2002-059130, filed in the Japanese Patent Office on Mar. 5, 2003, the entire contents of which being incorporated herein by reference.

BACKGROUND OF THE INVENTION

1. Field of the Invention

The present invention relates to information processing apparatuses, information processing terminals, information processing methods, information processing systems, recording media, and programs, and more particularly, to an information processing apparatus, an information processing terminal, an information processing method, an information processing system, a recording medium, and a program suited to a case in which data is transmitted and received through a network.

2. Description of the Related Art

There has been conventionally a technology in which a server for storing compressed audio data and a player (reproduction) apparatus for reproducing compressed audio data are connected through a network, and the user operates the player apparatus to receive compressed audio data from the player apparatus to receive compressed audio data from the server, to decode the received compressed audio data, to convert the audio data to non-compressed data, and to apply digital-to-analog (D/A) conversion to the non-compressed data to reproduce the desired music data.

When data is distributed through a wide area network, such as the Internet, by a protocol which cannot specify a transfer path on the network, for example, since the transfer rate is determined by a portion having the lowest communication rate in the data transfer path, that is, a bottleneck, if such a bottleneck exists in the transfer path, it takes a very long time to transmit and receive a large amount of data. To solve this problem, there are many data compression techniques for compressing data while reducing transfer errors. Such audio-data compression techniques include MPEG-1 audio layer-3 (MP3), advanced transform acoustic coding (ATRAC), and WAV. Even when the amount (data transfer rate) of data to be distributed and received per unit period is small, if audio data is compressed and transmitted and received, comfortable data transfer is performed.

Not only when compressed audio data is distributed through a wide area network, such as the Internet, but when, for example, a network is configured in a house, and a server which has recorded compressed audio data and a terminal which can receive compressed audio data, decode it, and reproduce the original data are used, the user can play back the music and enjoy it at any place within the network environment by using a compact player apparatus which has not recorded audio data in its inside recording unit or to which a recording medium that has recorded audio data is not mounted.

A conventional system will be described below by referring to FIG. 1, in which a server and an audio player terminal which can reproduce audio data are provided in a network, the server records compressed audio data, and the audio player terminal decodes compressed audio data to reproduce the original data.

A server 1 and an audio player terminal 2 are connected to a network through a hub 3. The server 1 and the audio player terminal 2 may be connected to the hub 3 by wires or by radio. The hub 3 is connected to another network 5, such as the Internet, through a router 4. In FIG. 1, only one audio player terminal 2 is shown, and a description thereof is made. A plurality of audio player terminals may be connected to the hub 3.

A control section 11 of the server 1 is formed of a central processing unit (CPU), a read only memory (ROM), and a random access memory (RAM), and controls the processing of the server 1. A communication section 12 transmits and receives data to and from the audio player terminal 2, connected to the same network through the hub 3, and further, to and from other information processing apparatuses connected to the network 5 through the router 4, under the control of the control section 11. A compressed-audio-data recording section 13 records compressed audio data encoded in a predetermined format, such MP3, ATRAC, or WAV.

A control section 21 of the audio player terminal 2 is formed of a CPU, a ROM, and a RAM, and controls the processing of the audio player terminal 2. A display section 22 is formed, for example, of a liquid-crystal display (LCD), and displays text or an image according to the control of the control section 21. An operation input section 23 is formed, for example, of a button, a keyboard, a mouse, or a touch sensitive panel, receives an operation input of the user, and outputs it to the control section 21.

A communication section 24 transmits and receives information to and from the server 1 through the hub 3 according to the control of the control section 21. A decoder 25 receives compressed audio data from the server 1 through the communication section 24, and decodes (decompresses) it to convert the compressed audio data having a predetermined format to linear pulse-code-modulation (PCM) data.

Linear PCM data is obtained by sampling analog audio data at a constant interval, by quantizing it, and then, by converting it to binary data, and is equal to digital audio data obtained by applying A/D conversion to the analog audio data. The quality of reproduced sound depends on the sampling frequency and the number of quantization bits.

A buffer 26 receives the linear PCM data obtained by decoding from the decoder 25, buffers it, and outputs it to a D/A conversion section 27 at predetermined timing. The D/A conversion section 27 converts the input linear PCM data to an analog signal, and outputs it to a speaker 28 to reproduce the sound.

Processes performed by the server 1 and the audio player terminal 2 will be described next. It is assumed that the compressed-audio-data recording section 13 has recorded various kinds of musical-piece data as compressed audio data having a predetermined format, together with the titles thereof.

The control section 21 of the audio player terminal 2 generates a request for asking the server 1 to send a list of musical pieces (titles thereof) of the compressed audio data recorded in the compressed-audio-data recording section 13 of the server 1, and sends the request to the server 1 through the communication section 24 and the hub 3.

Generally, text information, such as the list of musical pieces transferred between the server 1 and the audio player terminal 2, is transmitted and received by using a Hypertext Transfer Protocol (HTTP) in many cases. In HTTP, a request for sending information is sent from a client (the audio player terminal 2 in FIG. 1) to a server (the server 1 in FIG. 1), and the server sends back a response to the request. In other words, one batch of communication is formed of one set of a request and a response, and is called a session.

The control section 11 of the server 1 receives a request from the audio player terminal 2 through the communication section 12, and transmits the list of the musical pieces of the compressed audio data recorded in the compressed-audio-data recording section 13 as a response to the request, to the audio player terminal 2 through the communication section 12 and the hub 3.

The control section 21 of the audio player terminal 2 receives the input of the list of the musical pieces through the communication section 24, and displays it on the display section 22 or records it in an internal RAM such that the list is displayed on the display section 22 when the user inputs a predetermined operation at the operation input section 23.

The user refers to the list of the musical pieces displayed on the display section 22 to select a desired musical piece and to instruct to play back the musical piece by using the operation input section 23. The control section 21 receives a signal indicating the user's operation inputs from the operation input section 23, generates a request for sending the compressed audio data corresponding to the desired musical piece of the user, and sends it to the server 1 through the communication section 24 and the hub 3.

The control section 11 of the server 1 receives the request from the audio player terminal 2 through the communication section 12, searches the compressed audio data recorded in the compressed-audio-data recording section 13 for the compressed audio data corresponding to the user's desired musical piece, and outputs it as a response to the request to the audio player terminal 2 through the communication section 12 and the hub 3. When the transmitted compressed audio data is stereo audio data, for example, the transfer rate of the compressed audio data is about 64 Kbps to 320 Kbps.

The control section 21 of the audio player terminal 2 makes the decoder 25 decode the compressed audio data input through the communication section 24, buffers the decoded data in the buffer 26, converts the data into analog audio data in the D/A conversion section 27, and outputs it through the speaker 28 to play back the musical piece.

There are a method called stream transfer or stream distribution and a method called download distribution to transmit audio data from the server 1 to the audio player terminal 2. In stream distribution, the audio player terminal 2 can reproduce in real time audio data transmitted by the server 1. In the system shown in FIG. 1, while the audio player terminal 2 receives compressed audio data from the server 1, the audio player terminal 2 decodes the data and reproduce it in real time. In download distribution, the server 1 sends all data to the audio player terminal 2, and the audio player terminal 2 can perform a reproduction process when the audio player terminal 2 has received all the data. In the system shown in FIG. 1, after the audio player terminal 2 receives all compressed audio data, the audio player terminal 2 decodes the data to playback the original musical piece.

However, in stream distribution, the audio player terminal 2 needs to include a buffer memory having a capacity required for continuously decoding received compressed audio data and for playing back the original musical piece. In download distribution, the audio player terminal 2 needs to include a memory having a capacity required for temporarily storing all compressed audio data before decoding, or to have a structure to which an external recording medium for temporarily storing all compressed audio data can be mounted.

Since, as a unit for controlling processing executed by the audio player terminal 2, a central processing unit (CPU), a digital signal processor (DSP), or others having a processing capability of decoding compressed audio data received from the server 1 needs to be selected, the cost of the audio player terminal 2 is increased.

When the audio player terminal 2 can be carried by the user, for example, a battery is used as a power source of the audio player terminal 2. In such a case, since it is necessary to supply electric power required to make the CPU or the DSP perform decoding, the driving time of the battery is short or the battery becomes large.

SUMMARY OF THE INVENTION

The present invention has been made in consideration of the foregoing conditions. Accordingly, it is an object of the present invention to allow a terminal for reproducing received data, such as audio data, to receive and reproduce not-compressed data, such as linear PCM data.

The foregoing object is achieved in one aspect of the present invention through the provision of an information processing apparatus for stream-distributing data to an information processing terminal, including determination means for determining whether data to be distributed can be stream-distributed to the information processing terminal; and transmission means for stream-distributing the data to be distributed, to the information processing terminal when the determination means determines that the data to be distributed can be stream-distributed to the information processing terminal.

The information processing apparatus may be configured such that it further includes data decompression means for reading compressed data corresponding to the data to be distributed, and for decompressing the compressed data to generate the data to be distributed, and the data decompressed by the data decompression means is stream-distributed by the transmission means.

The determination means may detect a data transfer rate with the information processing terminal and determine according to the result of detection whether the data to be distributed can be stream-distributed to the information processing terminal.

The information processing apparatus may be configured such that it further includes data conversion means for converting the data to be distributed, according to the transfer rate detected by the determination means, and data generated by the data conversion means is stream-distributed by the transmission means.

The determination means may include data receiving means for receiving a predetermined amount of data from the information processing terminal, measurement means for measuring the transfer time of the predetermined amount of data received by the data receiving means; and calculation means for calculating the transfer rate according to the predetermined amount of data and the transfer time measured by the measurement means.

The information processing apparatus may be configured such that it further includes data receiving means for receiving the transfer rate from the information processing terminal, and the determination means determines whether the data to be distributed can be stream-transmitted to the information processing terminal, according to the transfer rate received by the data receiving means after the transmission means sends the predetermined amount of data to the information processing terminal.

The determination means may determine whether the information processing terminal and the information processing apparatus are connected to the same network, and determine according to the result of determination whether the data to be distributed can be stream-transmitted to the information processing terminal.

The determination means may compare addresses assigned by a predetermined communication protocol to the information processing apparatus and to the information processing terminal to determine whether the information processing terminal and the information processing apparatus are connected to the same network.

The determination means may determine that the information processing terminal and the information processing apparatus are connected to the same network, when the addresses of the information processing apparatus and the information processing terminal have the same network section.

The determination means may determine that the information processing terminal and the information processing apparatus are connected to the same network, when the addresses of the information processing apparatus and the information processing terminal fall in the same private-address range.

The determination means may determine that the information processing terminal and the information processing apparatus are connected to the same network, when the addresses of the information processing apparatus and the information processing terminal fall in the same link-local-address range.

The determination means may determine that the information processing terminal and the information processing apparatus are connected to the same network, when the addresses of the information processing apparatus and the information processing terminal fall in the same site-local-address range.

The determination means may determine that the information processing terminal and the information processing apparatus are connected to the same network, when it is determined that the information processing terminal is managed by a router which manages the information processing apparatus.

The information processing apparatus may be configured such that such that it further includes data receiving means for receiving, from the information processing terminal, information related to a network to which the information processing terminal is connected, and the determination means determines according to the information received by the data receiving means whether the information processing terminal and the information processing apparatus are connected to the same network.

The network may be formed of a plurality of network segments.

The network may be formed of only one network segment.

The data conversion means may convert the data to be distributed to data having a lower data rate than the transfer rate with the information processing terminal, detected by the determination means.

The data conversion means may reduce at least one of the number of quantization bits and the sampling frequency of the data to be distributed, to reduce the data rate of data obtained by the conversion.

The information processing apparatus may further includes message transmission means for transmitting to the information processing terminal a message indicating that the data to be distributed cannot be transmitted, when the determination means determines that the data to be distributed cannot be stream-distributed to the information processing terminal.

The foregoing object is achieved in another aspect of the present invention through the provision of an information processing method for stream-distributing data to an information processing terminal, including the steps of determining whether data to be distributed can be stream-distributed to the information processing terminal; and stream-distributing the data to be distributed, to the information processing terminal when it is determined that the data to be distributed can be stream-distributed to the information processing terminal.

The information processing method may be configured such that it further includes a step of reading compressed data corresponding to the data to be distributed, and for decompressing the compressed data to generate the data to be distributed, and the generated data is stream-distributed to the information processing terminal.

The foregoing object is achieved in still another aspect of the present invention through the provision of a recording medium readable by an information processing apparatus for stream-distributing data to an information processing terminal and having stored thereon a program for the information processing apparatus, the program including the steps of determining whether data to be distributed can be stream-distributed to the information processing terminal; and stream-distributing the data to be distributed to the information processing terminal when it is determined that the data to be distributed can be stream-distributed to the information processing terminal.

The program may be configured such that it further includes a step of reading compressed data corresponding to the data to be distributed, and of decompressing the compressed data to generate the data to be distributed, and the generated data is stream-distributed to the information processing terminal.

The foregoing object is achieved in yet another aspect of the present invention through the provision of a program executable by a computer for controlling an information processing apparatus which stream-distributes data to an information processing terminal, including the steps of determining whether data to be distributed can be stream-distributed to the information processing terminal; and stream-distributing the data to be distributed, to the information processing terminal when it is determined that the data to be distributed can be stream-distributed to the information processing terminal.

The program may be configured such that it further includes a step of reading compressed data corresponding to the data to be distributed, and for decompressing the compressed data to generate the data to be distributed, and the generated data is stream-distributed to the information processing terminal.

In the information processing apparatus, the information processing method, the recording medium, and the program described above, it is determined whether data to be distributed can be stream-distributed to an information processing terminal, and the data to be distributed is stream-distributed to the information processing terminal when it is determined that the data to be distributed can be stream-distributed to the information processing terminal.

As described above, according to the present invention, the information processing apparatus can transmit data to the information processing terminal.

In addition, the information processing apparatus can determine whether data to be distributed can be stream-distributed to the information processing terminal. The information processing apparatus can stream-distribute the data to be distributed, to the information processing terminal when it is determined that the data to be distributed can be stream-distributed to the information processing terminal.

The foregoing object is achieved in still yet another aspect of the present invention through the provision of an information processing terminal for receiving and reproducing data stream-distributed by an information processing apparatus, including generation means for generating information used by the information processing apparatus to determine whether data to be distributed can be stream-distributed; transmission means for transmitting the information generated by the generation means to the information processing apparatus; receiving means for receiving not-compressed data stream-distributed by the information processing apparatus; and reproduction means for reproducing the data received by the receiving means.

The information processing terminal may further include second receiving means for receiving a message indicating that the data cannot be transmitted, from the information processing apparatus, and display means for displaying the message received by the second receiving means.

The generation means may generate as the information, a predetermined amount of data used for measuring the transfer rate of data sent from the information processing apparatus.

The information processing terminal may be configured such that it further includes second receiving means for receiving a predetermined amount of data from the information processing apparatus; measurement means for measuring the transfer time of the predetermined amount of data received by the second receiving means; and calculation means for calculating a transfer rate according to the predetermined amount of data and the transfer time measured by the measurement means, and the generation means generates the information according to the transfer rate calculated by the calculation means.

The information processing terminal may be configured such that it further includes determination means for determining whether the information processing apparatus and the information processing terminal are connected to the same network, and the generation means generates the information according to the result of determination made by the determination means.

The determination means may compare addresses assigned by a predetermined communication protocol to the processing terminal to determine whether the information processing terminal and the information processing apparatus are connected to the same network.

The determination means may determine that the information processing terminal and the information processing apparatus are connected to the same network, when the addresses of the information processing apparatus and the information processing terminal have the same network section.

The determination means may determine that the information processing terminal and the information processing apparatus are connected to the same network, when the addresses of the information processing apparatus and the information processing terminal fall in the same private-address range.

The determination means may determine that the information processing terminal and the information processing apparatus are connected to the same network, when the addresses of the information processing apparatus and the information processing terminal fall in the same link-local-address range.

The determination means may determine that the information processing terminal and the information processing apparatus are connected to the same network, when the addresses of the information processing apparatus and the information processing terminal fall in the same site-local-address range.

The determination means may determine that the information processing terminal and the information processing apparatus are connected to the same network, when it is determined that the information processing apparatus is managed by a router which manages the information processing terminal.

The network may be formed of a plurality of network segments.

The network may be formed of only one network segment.

The reproduction means may reproduce the data according to a parameter described in the header of the data received by the receiving means.

The parameter may include at least one of the number of quantization bits and the sampling frequency of the data.

The foregoing object is achieved in a further aspect of the present invention through the provision of an information processing method for receiving and reproducing data stream-distributed by an information processing apparatus, including the steps of generating information used by the information processing apparatus to determine whether data to be distributed can be stream-distributed; transmitting the generated information to the information processing apparatus; receiving not-compressed data stream-distributed by the information processing apparatus; and reproducing the received data.

The foregoing object is achieved in a still further aspect of the present invention through the provision of a recording medium readable by an information processing terminal for receiving and reproducing data stream-distributed by an information processing apparatus and having stored thereon a program for the information processing terminal, the program including the steps of generating information used by the information processing apparatus to determine whether data to be distributed can be stream-distributed; transmitting the generated information to the information processing apparatus; receiving not-compressed data stream-distributed by the information processing apparatus; and reproducing the received data.

The foregoing object is achieved in a yet further aspect of the present invention through the provision of a program executable by a computer for controlling an information processing terminal which receives and reproduces data stream-distributed by an information processing apparatus, including the steps of generating information used by the information processing apparatus to determine whether data to be distributed can be stream-distributed; transmitting the generated information to the information processing apparatus; receiving not-compressed data stream-distributed by the information processing apparatus; and reproducing the received data.

In the information processing terminal, the information processing method, the recording medium, and the program described above, information used by an information processing apparatus to determine whether data to be distributed can be stream-distributed is generated, the generated information is transmitted to the information processing apparatus, not-compressed data stream-distributed by the information processing apparatus is received, and the received data is reproduced.

As described above, according to the present invention, the information processing terminal can reproduce data received from the information processing apparatus.

In addition, the information processing terminal can generate information used by an information processing apparatus to determine whether data to be distributed can be stream-distributed, and transmit it to the information processing apparatus.

The foregoing object is achieved in a yet still further aspect of the present invention through the provision of an information processing system including an information processing apparatus and an information processing terminal, wherein the information processing apparatus stream-distributes data to the information processing terminal and the information processing terminal receives and reproduces the stream-distributed data, the information processing apparatus includes determination means for determining whether data to be distributed can be stream-distributed to the information processing terminal; and transmission means for stream-distributing the data to be distributed, to the information processing terminal when the determination means determines that the data to be distributed can be stream-distributed to the information processing terminal, and the information processing terminal includes receiving means for receiving not-compressed data stream-distributed by the information processing apparatus; and reproduction means for reproducing the data received by the receiving means.

The information processing system may be configured such that the information processing apparatus further includes data decompression means for reading compressed data corresponding to the data to be distributed, and for decompressing the compressed data to generate the data to be distributed, and the data decompressed by the data decompression means is stream-distributed by the transmission means.

The information processing system may be configured such that the information processing terminal further includes generation means for generating information used by the information processing apparatus to determine whether the data to be distributed can be stream-distributed; and information transmission means for transmitting the information generated by the generation means to the information processing apparatus, the information processing apparatus further includes information receiving means for receiving the information transmitted by the information transmission means, and the determination means determines whether the data to be distributed can be transmitted to the information processing terminal, according to the information received by the information receiving means.

In the information processing system described above, an information processing apparatus determines whether data to be distributed can be stream-distributed to an information processing terminal, and stream-distributes the data to be distributed to the information processing terminal when it is determined that the data to be distributed can be stream-distributed to the information processing terminal, and the information processing terminal receives not-compressed data stream-distributed by the information processing apparatus, and reproduces the received data.

As described above, according to the present invention, the data transmitted by the information processing apparatus can be received and reproduced by the information processing terminal.

In addition, the information processing apparatus can determine whether data to be distributed can be stream-distributed to the information processing terminal. When it is determined that the data to be distributed can be stream-distributed to the information processing terminal, the information processing apparatus stream-distributes the data to be distributed to the information processing terminal.

The network means a mechanism in which at least two apparatuses are connected and an apparatus can send information to another apparatus. The apparatuses communicating with each other through the network may be independent apparatuses, or internal blocks constituting one unit.

Data and information may be transmitted and received, in addition to by radio or by a wire, through a transfer path in which radio and a wire are used in a mixed manner, more precisely, through a path in which radio is used at a certain zone and a wire is used at the other zone.

BRIEF DESCRIPTION OF THE DRAWINGS

FIG. 7 is a block diagram of a personal computer.

DESCRIPTION OF THE PREFERRED EMBODIMENTS

Figure 1:
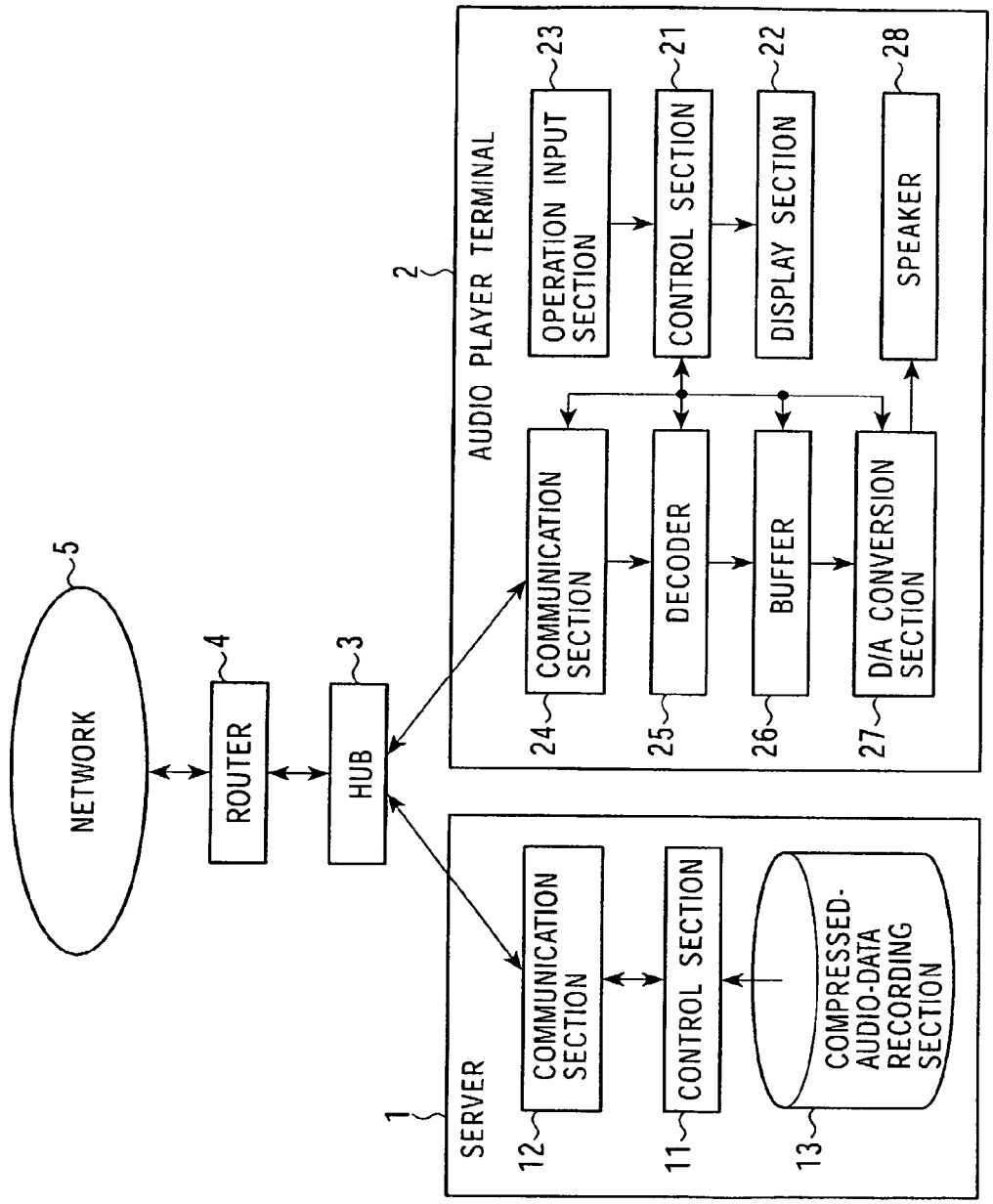
FIG. 1 is a block diagram of a conventional server and a conventional audio player terminal.

Embodiments of the present invention will be described below by referring to the drawings.

Figure 2:
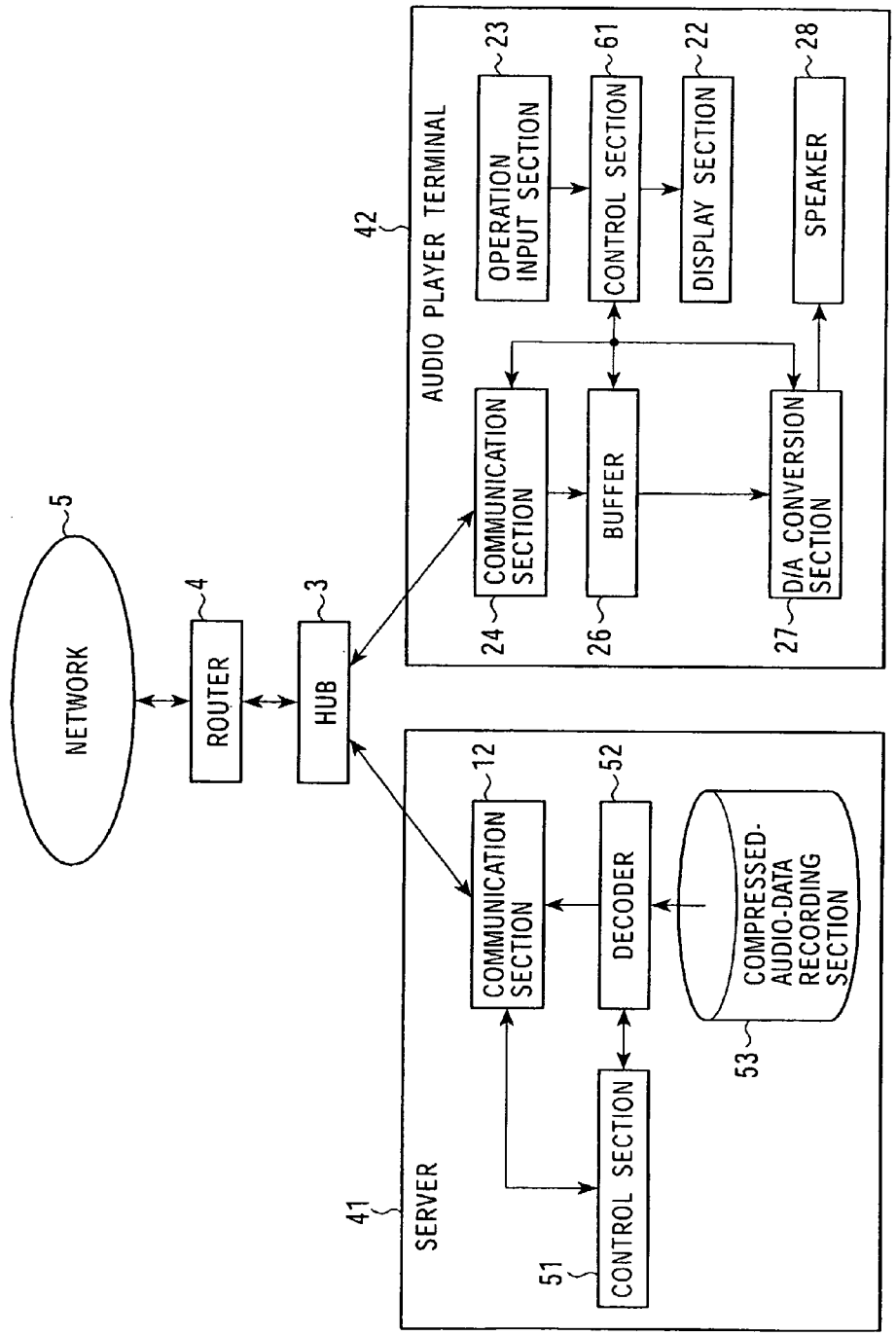
FIG. 2 is a block diagram of a server and an audio player terminal according to the present invention.

FIG. 2 is a view of a system for distributing and reproducing audio data, according to the present invention.

The same symbols as those used in the conventional case are applied to the portions corresponding to those described in the conventional case, and a description thereof is omitted.

A server 41 and an audio player (reproduction) terminal 42 are connected to a network through a hub 3. The server 41 and the audio player terminal 42 may be connected to the hub 3 by wires or by radio.

Due to the development of recent communication technologies, it is possible to transmit and receive a larger amount of data at a higher speed than before, with both wire communication and radio communication. Especially in data communications inside local area networks (LANs) configured in houses or companies, the amount of data which can be transmitted per unit time has become very large.

In the Institute of Electrical and Electronic Engineers (IEEE), LANs are standardized by an IEEE 802 series in 16 groups. For example, 10-Mbps Ethernet®, which is widely used conventionally, is standardized by an IEEE 802.3 group, and radio LANs are standardized by an IEEE 802.11 group.

In wired communications, a 100BASE-T Ethernet® standard having a transfer rate of 100 Mbps is provided. In recent years, 1000BASE-T having a transfer rate of 1 gigabits has been widely used.

Conventionally, IEEE 802.11 specifies a communication speed in radio LANs at 2 Mbps. A new standard, IEEE 802.11b, which specifies a communication speed of 11 Mbps, had been made, and then, further, a standard, IEEE 802.11a, which specifies a communication speed of 54 Mbps, was made.

The hub 3 is connected to another network 5, such as the Internet, through a router 4. In FIG. 2, only one audio player terminal 42 is shown, and a description thereof is made. A plurality of audio player terminals 42 may be connected to the hub 3. Further, the system may be configured such that a plurality of servers 41 is connected to the hub 3, and a plurality of audio player terminals 42 is connected to each server 41.

Whether the server 41 and the audio player terminal 42 are connected to the same network can be determined by referring to addresses specified by a communication protocol (in this case, it is assumed that an Internet Protocol (IP) is used).

When the network is configured in IPv4, whether the server 41 and the audio player terminal 42 are connected to the same network is determined by whether the network sections of their IP addresses are the same or belong to the same private-address range. It is possible that one network is configured with only one network segment, and that a network is configured with a plurality of network segments having the same network address being connected. A network segment is a set of connection units having IP addresses in which the network sections are the same, and indicates a collision domain, which is a range in which a collision signal is transmitted on Ethernet, in a TCP/IP protocol. In Ethernet, a range in which broadcast reaches is called a broadcast domain. Since a router does not relay broadcast, a broadcast domain forms one network.

Private addresses are IP addresses which can be used as network addresses inside a group, such as a house or a company, which does not require a continuous Internet connection, and are specified by RFC 1918. The following private addresses can be used.

Class A: 10.0.0.0-10.255.255.255
Class B: 172.16.0.0-172.31.255.255
Class C: 192.168.0.0-192.168.255.255

When the network is configured in IPv6, whether the server 41 and the audio player terminal 42 are connected to the same network is determined by whether their addresses fall in a link-local-address range (effective address range in the same segment) or in a site-local-address range (effective address range in a closed site (which may include a plurality of segments)).

Whether the server 41 and the audio player terminal 42 are connected to the same network may mean that they are connected by a physical network, that is, that they are in the same network segment. Alternatively, they are in a set of a plurality of segments in which their addresses have the same network address section in IPv4 or in which their addresses fall in the same site-local-address range in IPv6.

In FIG. 2, only one hub 3 is connected to the router 4, and the server 41 and the audio player terminal 42 serving as units connected to the hub 3 are connected to the same network. As described above, other many units can be connected to the same network in various forms.

A control section 51 of the server 41 is formed of a CPU, a ROM, and a RAM, and controls the processing of the server 41. A communication section 12 transmits and receives data to and from the audio player terminal 42, connected to the same network through the hub 3, and further, to and from other information processing apparatuses connected to the network 5 through the router 4, under the control of the control section 51.

A compressed-audio-data recording section 53 is formed of a recording medium, such as a hard disk, provided for the server 41 in its inside and a drive for the recording medium. Alternatively, the compressed-audio-data recording section 53 is formed of a removable disk, such as a compact disk (CD), and a drive, such as a CD drive, for reading information from the removable disk. In FIG. 2, the compressed-audio-data recording section 53 is provided for the server 41 in its inside. The server 41 may be configured such that the server 41 is provided with an interface terminal for transmitting and receiving information to and from an external unit, and the compressed-audio-data recording section 53 is provided outside the server 41. The compressed-audio-data recording section 53 records compressed audio data having a predetermined format, such MP3, ATRAC, or WAV.

A decoder 52 reads predetermined compressed audio data from the compressed-audio-data recording section 53, and decodes it to convert to linear PCM data, according to the control of the control section 51. The decoder 52 can change the sampling frequency and the number of quantization bits of the linear PCM data generated by decoding, under the control of the control section 51.

A control section 61 of the audio player terminal 42 is formed of a CPU, a ROM, and a RAM, and controls the processing of the audio player terminal 42. A display section 22 and an operation input section 23 have the same structures as in the case described above by referring to FIG. 1, and therefore, a description thereof is omitted.

A communication section 24 transmits and receives information to and from the server 41 through the hub 3 according to the control of the control section 61.

A buffer 26 receives the linear PCM data from the server 41 through the communication section 24, buffers it, and outputs it to a D/A conversion section 27 at predetermined timing. The D/A conversion section 27 converts the input linear PCM data to an analog signal, and outputs it to a speaker 28 to reproduce the sound.

Processes performed by the server 41 and the audio player terminal 42, shown in FIG. 2, will be described next. It is assumed that the compressed-audio-data recording section 53 has recorded musical-piece data encoded in a predetermined format, together with the titles of the musical pieces.

The control section 61 of the audio player terminal 42 generates a request for asking the server 41 to send a list of the titles of the musical-piece data recorded in the compressed-audio-data recording section 53 of the server 41, and sends the request to the server 41 through the communication section 24 and the hub 3.

The control section 51 of the server 41 receives the request from the audio player terminal 42 through the communication section 12, and transmits the list of the titles of the musical-piece data recorded in the compressed-audio-data recording section 53 as a response to the request, to the audio player terminal 42 through the communication section 12 and the hub 3.

The control section 61 of the audio player terminal 42 receives the input of the list of the musical pieces through the communication section 24, and displays it on the display section 22 or records it in an internal RAM such that the list is displayed on the display section 22 when the user inputs a predetermined operation at the operation input section 23.

In the same way as in the conventional case, text data such as the list of the musical pieces can be transmitted and received between the server 41 and the audio player terminal 42 by HTTP also in the case shown in FIG. 2. Any protocol other than HTTP can be used for transmitting and receiving text data between the server 41 and the audio player terminal 42.

When HTTP is used as a protocol for data transmission and receiving, a request for sending information is sent from a client (the audio player terminal 42 in FIG. 2) to a server (the server 41 in FIG. 2), and the server sends back a response to the request. In other words, one batch of communication is formed of one set of a request and a response, and is called a session.

The user refers to the list of the musical pieces displayed on the display section 22 to select a desired musical piece and instructs to play back the musical piece by using the operation input section 23. The control section 61 receives a signal indicating the user's operation inputs from the operation input section 23, generates a request for sending the audio data corresponding to the desired musical piece of the user, and sends it to the server 41 through the communication section 24 and the hub 3.

The control section 51 of the server 41 receives the request from the audio player terminal 42 through the communication section 12.

The control section 51 of the server 41 and the control section 61 of the audio player terminal 42 measure the transfer rate of data transferred mutually through the hub 3. When an appropriate transfer rate is not provided in data transfer mutually performed between the server 41 and the audio player terminal 42 through the hub 3, even if the server 41 sends linear PCM data, the audio player terminal 42 cannot correctly play back the corresponding musical piece. Therefore, the control section 51 determines from the result of the transfer-rate measurement whether decoded linear PCM data is allowed to (can) be transmitted. A method for measuring the data transfer rate will be described later.

When it is determined according to the measurement result that the decoded linear PCM data is allowed to be transmitted, the control section 51 searches the musical-piece data recorded in the compressed-audio-data recording section 53 for the user's desired audio data, and makes the decoder 52 decode it. The linear PCM data decoded by the decoder 52 is output as a response to the request, to the audio player terminal 42 through the communication section 12 and the hub 3.

In contrast, when it is determined that the decoded linear PCM data is not allowed to be transmitted, the control section 51 generates an error message as a response to the request and sends it to the audio player terminal 42 through the communication section 12 and the hub 3.

The control section 51 may control the decoder 52 according to the measurement result of the transfer rate to reduce the sampling frequency of (to down-sample) or to reduce the number of quantization bits of the decoded linear PCM data.

The control section 61 of the audio player terminal 42 buffers the linear PCM data input through the communication section 24 in the buffer 26, converts the data into analog audio data in the D/A conversion section 27, and outputs it through the speaker 28.

When the audio player terminal 42 is driven by a battery (not shown), so that the user can enjoy music at any place in the network, if the audio player terminal 42 does not perform decoding, as in the present embodiment, its power consumption is reduced and therefore the battery can be made compact and can work for a long period. In addition, when a plurality of audio player terminals 42 is connected to one server 41, the cost of the system is greatly reduced compared with a case in which each of the plurality of audio player terminals 42 performs decoding.

In FIG. 2, the server 41 has the control section 51 and the decoder 52 as blocks for executing different processes, and the audio player terminal 42 has the buffer 26, the D/A conversion section 27, and the control section 61 as blocks for executing different processes. It may be possible that the processes executed by the blocks in the server 41 are performed by only one calculation processing block, and the processes executed by the blocks in the audio player terminal 42 are performed by only one calculation processing block.

The processing performed by the server 41 and the audio player terminal 42, shown in FIG. 2, may be executed, for example, by a general-purpose personal computer. In addition, the processing performed by the audio player terminal 42 can be executed by any units which can receive user's operation inputs, receive information (linear PCM data in this case), and apply D/A conversion to the information to reproduce the original and output it, such as a personal digital (data) assistance (PDA), a portable telephone, a general audio unit, and a general radio receiver.

In the system for distributing and reproducing audio data, described by referring to FIG. 2, since the server 41 decodes compressed audio data, the server 41 sends linear PCM data to the audio player terminal 42. Therefore, it is not necessary for the audio player terminal 42 to perform decoding. The amount of processing in the audio player terminal 42 is reduced, its power consumption is reduced, and further, its internal circuit for calculation processing can be simplified.

The processing of the server 41, shown in FIG. 2, will be described next by referring to a flowchart shown in FIG. 3.

In step S1, the control section 51 of the server 41 performs a mutual recognition process with the audio player terminal 42 (also possible, with a plurality of audio player terminals 42).

In the mutual recognition process, whether the server 41 and the audio player terminal 42 are connected to the same network is mutually checked. As described above, when the network is configured by IPv4, whether the server 41 and the audio player terminal 42 are connected to the same network is determined by whether the network sections of their IP addresses belong to the same private-address range. Whether the server 41 and the audio player terminal 42 are connected to different network segments in the same network formed of a plurality of network segments is determined by whether the network sections of their IP addresses are the same. When the network is configured by IPv6, whether the server 41 and the audio player terminal 42 are connected to the same network is determined by whether their addresses fall in a link-local-address range (effective address range in the same segment) or in a site-local-address range (effective address range in a closed site (which may include a plurality of segments)).

When a terminal having a radio communication capability detects the nearest server or a router which controls unit connections, to perform communications, such as in a case in which a portable telephone detects a base station, it is generally determined that terminals having a radio communication capability, which are located in a range (within a distance in which information can be transmitted and received) in which a home router which controls unit connections can detect the presence of units are connected to the same network.

When the router 4 has the function of the home router, for example, if the server 41 and the audio player terminal 42 are located in a predetermined range in which the router 4 can detect them, since they are allocated addresses which indicate that they are connected to the same network, according to the structure of the network, it can be said that they are connected to the same network.

In a client-server system, a client (the audio player terminal 42 in this case) usually performs a process for checking whether the client and the server (the server 41 in this case) are connected to the same network or to the same segment. In this case, however, the audio player terminal 42, serving as the client, may check whether the audio player terminal 42 and the server 41 are connected to the same network or to the same segment; the server 41, serving as the server, may check whether the audio player terminal 42, serving as the client, and the server 41 are connected to the same network or to the same segment; or a unit other than the server 41 and the audio player terminal 42 may check whether the audio player terminal 42 and the server 41 are connected to the same network or to the same segment and report the result to the server 41 and the audio player terminal 42.

The mutual recognition process determines whether the server 41 and the audio player terminal 42 are connected to the same network or to the same segment. For example, a unit connected to the network 5 is connected to a network different from the network to which the server 41 and the audio player terminal 42 are connected, and transmits and receives information through the router 4. When the server 41 receives a request for sending a list of musical pieces or a request for sending audio data from an audio player terminal 42 connected to another network, in the process of each step described later, the server 41 can determine that the request source is the audio player terminal 42 connected to the another network.

In step S2, the control section 51 determines whether it has received a request for sending a list of musical pieces from the audio player terminal 42.

When it is determined in step S2 that the control section 51 has received a request for sending a list of musical pieces from the audio player terminal 42, the processing proceeds to step S3, and the control section 51 sends the list of musical pieces to the audio player terminal 42 through the communication section 12 and the hub 3.

When it is determined in step S2 that the control section 51 has not received a request for sending a list of musical pieces from the audio player terminal 42, or when the process of step S3 is finished, the control section 51 determines in step S4 whether it has received a request for sending audio data selected by the user from the audio player terminal 42.

Figure 5:
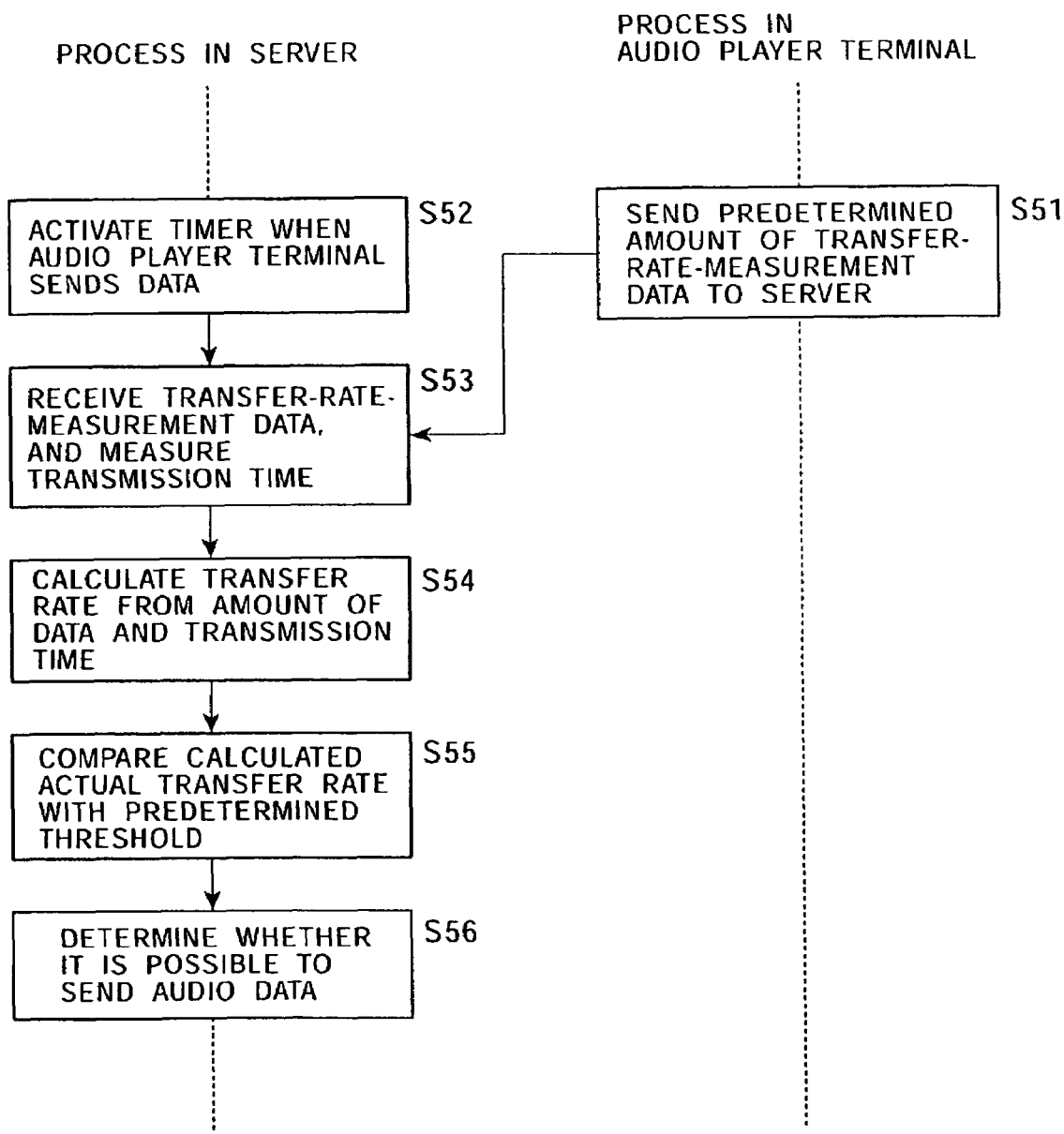
FIG. 5 is a flowchart of a transfer-rate measurement process executed in step S5 of FIG. 3 and in step S26 of FIG. 4.
Figure 6:
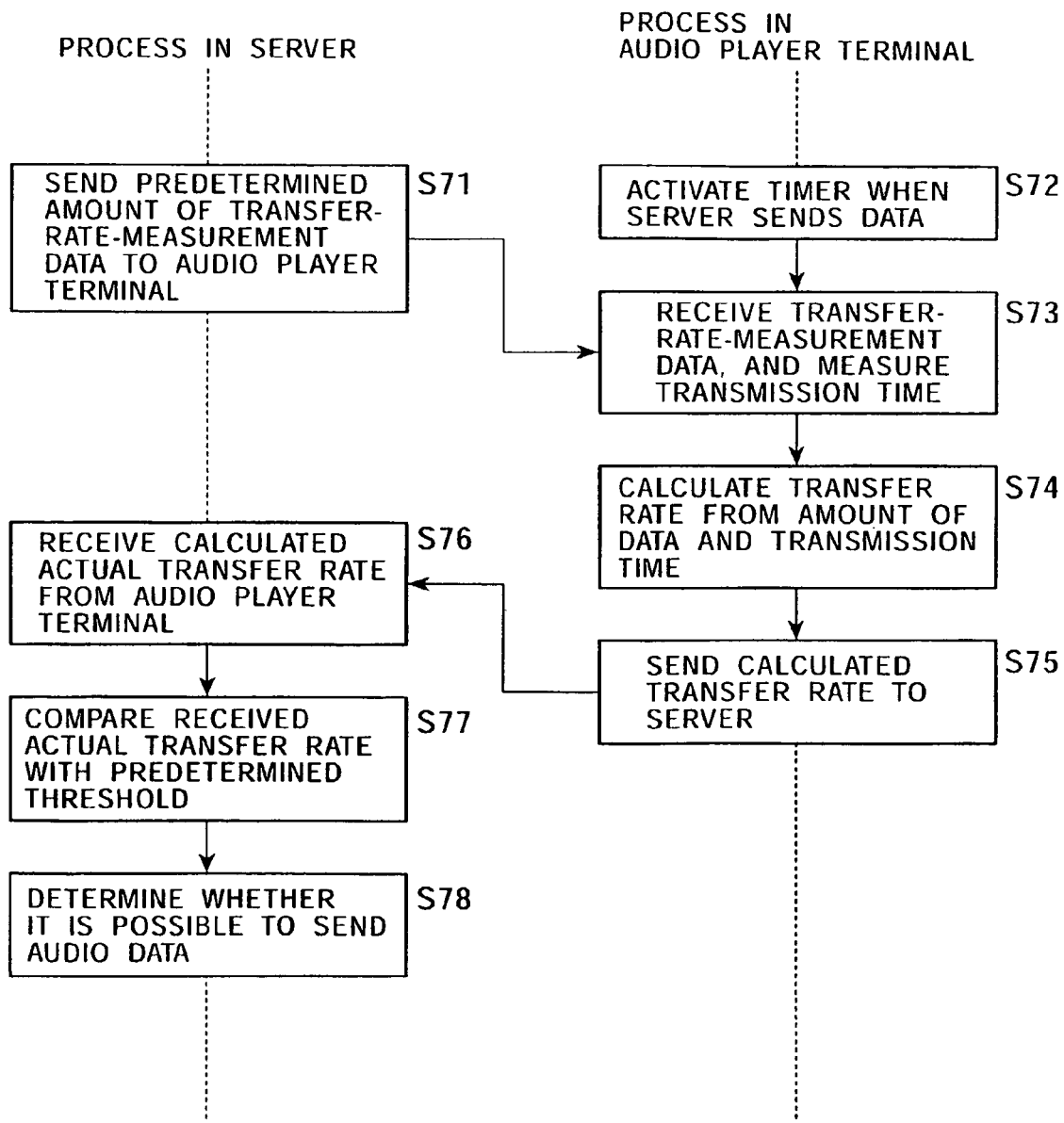
FIG. 6 is a flowchart of another transfer-rate measurement process executed in step S5 of FIG. 3 and in step S26 of FIG. 4.

When it is determined in step S4 that the control section 51 has not received a request for sending audio data selected by the user, from the audio player terminal 42, the processing returns to step S2, and the subsequent processes are repeated. When it is determined in step S4 that the control section 51 has received a request for sending audio data selected by the user, from the audio player terminal 42, the processing proceeds to step S5 and a transfer-rate measurement process described later by referring to FIG. 5 and FIG. 6 is performed.

In step S6, the control section 51 determines according to the measurement result of the transfer-rate measurement process executed in step S5 whether the audio data is allowed to be transmitted. For example, the control section 51 compares the measurement result of the transfer-rate measurement process executed in step S5 with a predetermined threshold to determine whether the audio data is allowed to be transmitted. It is assumed here that the control section 51 determines that audio data is allowed to be transmitted, when the measured transfer rate is 352.8 Kbps or higher, and determines that audio data is not allowed to be transmitted, when the measured transfer rate is lower than 352.8 Kbps.

When it is determined in step S6 that audio data is allowed to be transmitted, the processing proceeds to step S7 and the control section 51 extracts the compressed audio data corresponding to the requested musical piece from the compressed-audio-data recording section 53, and inputs it into the decoder 52.

In step S8, the decoder 52 decodes the extracted compressed audio data to generate linear PCM data suited to the transfer rate measured in the transfer-rate measurement process, described below. In other words, the decoder 52 decodes the data to generate linear PCM data having a data rate lower than the measured transfer rate.

When the transfer rate is 1.4112 Mbps or higher, the compressed audio data is decoded to generate two-channel (stereo) linear PCM data having a sampling frequency of 44.1 kHz and 16 quantization bits. When the transfer rate falls in a range from 705.6 Kbps (inclusive) to 1.4112 Mbps (exclusive), the compressed audio data is decoded to generate two-channel linear PCM data having a sampling frequency of 22.05 kHz (down-sampling) and 16 quantization bits. When the transfer rate falls in a range from 352.8 Kbps (inclusive) to 705.6 Kbps (exclusive), the compressed audio data is decoded to generate two-channel linear PCM data having a sampling frequency of 22.05 kHz (down-sampling) and eight quantization bits. When the transfer rate is less than 352.8 Kbps, it is determined that the compressed audio data is not transmitted. Information specified in this way, such as the sampling frequency and the number of quantization bits, is decoded and written in a header of the generated linear PCM data.

In step S9, the control section 51 sends the linear PCM audio data to the audio player terminal 42 through the communication section 12 and the hub 3, and the processing is terminated.

When it is determined in step S6 that the audio data is not allowed to be transmitted, the processing proceeds to step S10, the control section 51 sends an error message to the audio player terminal 42 through the communication section 12 and the hub 3, and the processing is terminated.

As described above, the server 41 receives a request for sending linear PCM audio data from the audio player terminal 42, and determines whether the audio data is allowed to be transmitted. When the linear PCM data is allowed to be transmitted, the sampling frequency or the number of quantization bits of the linear PCM data to be distributed is determined according to the measured data transfer rate, and the compressed audio data is decoded according to the determined values. Therefore, linear PCM data suited to the transfer rate is generated.

The sampling frequency or the number of quantization bits of the linear PCM data to be distributed is determined according to the measured data transfer rate. It is possible that the sampling frequency and the number of quantization bits of the linear PCM data to be distributed are constant, and the data transfer rate is compared with a predetermined threshold to only determine whether the linear PCM data is to be transmitted.

The processing of the audio player terminal 42 executed in parallel to the processing of the server 41, described by referring to FIG. 3 will be described next by referring to FIG. 4.

In step S21, the control section 61 of the audio player terminal 42 performs the mutual recognition process with the server 41. The mutual recognition process has been described above in the description of the process of step S1 shown in FIG. 3, and therefore a description thereof is omitted.

In step S22, the control section 61 generates a signal for requesting the server 41 to send the list of musical pieces, and sends the signal to the server 41 through the communication section 24 and the hub 3.

Figure 3:
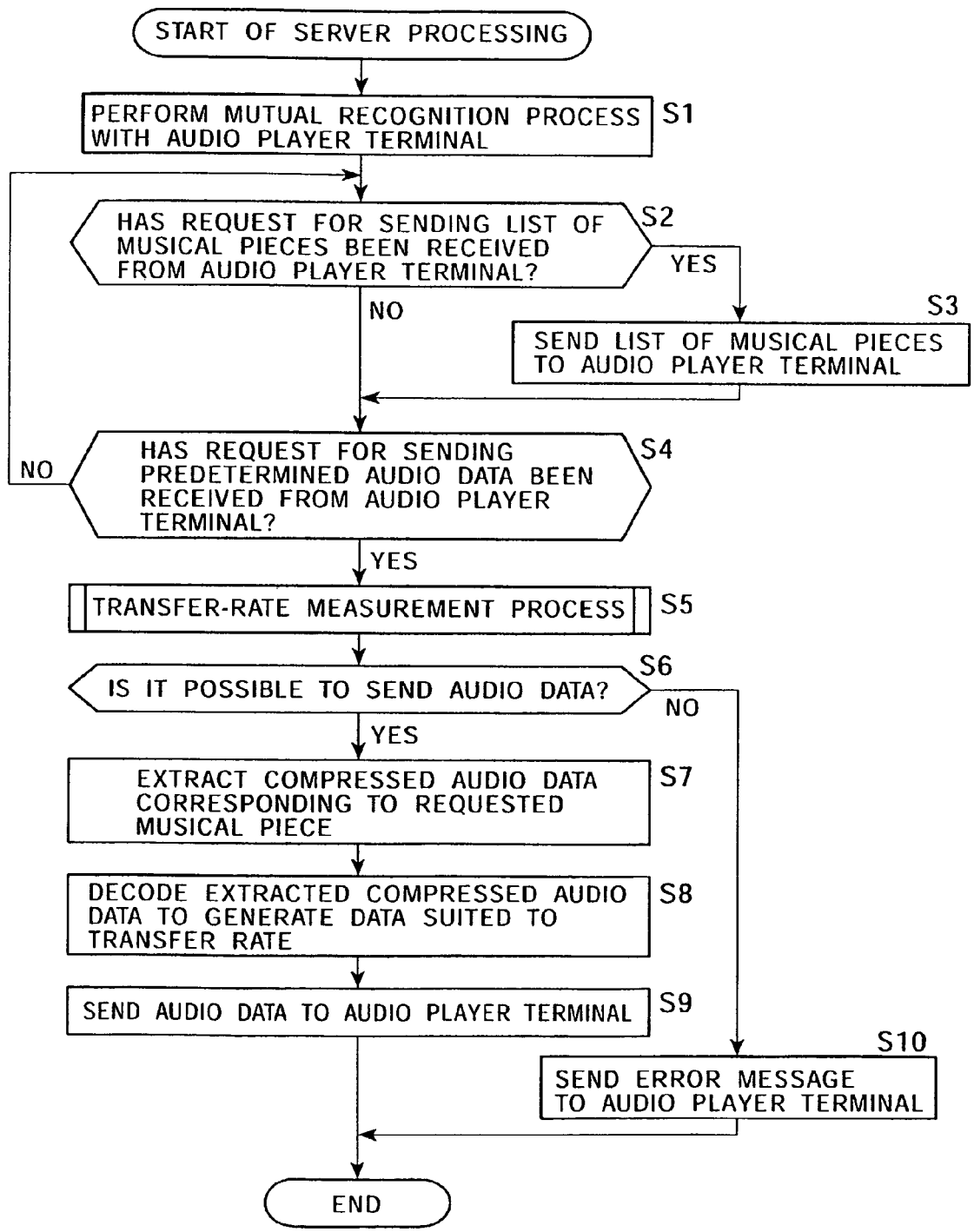
FIG. 3 is a flowchart of the processing of the server shown in FIG. 2.
Figure 4:
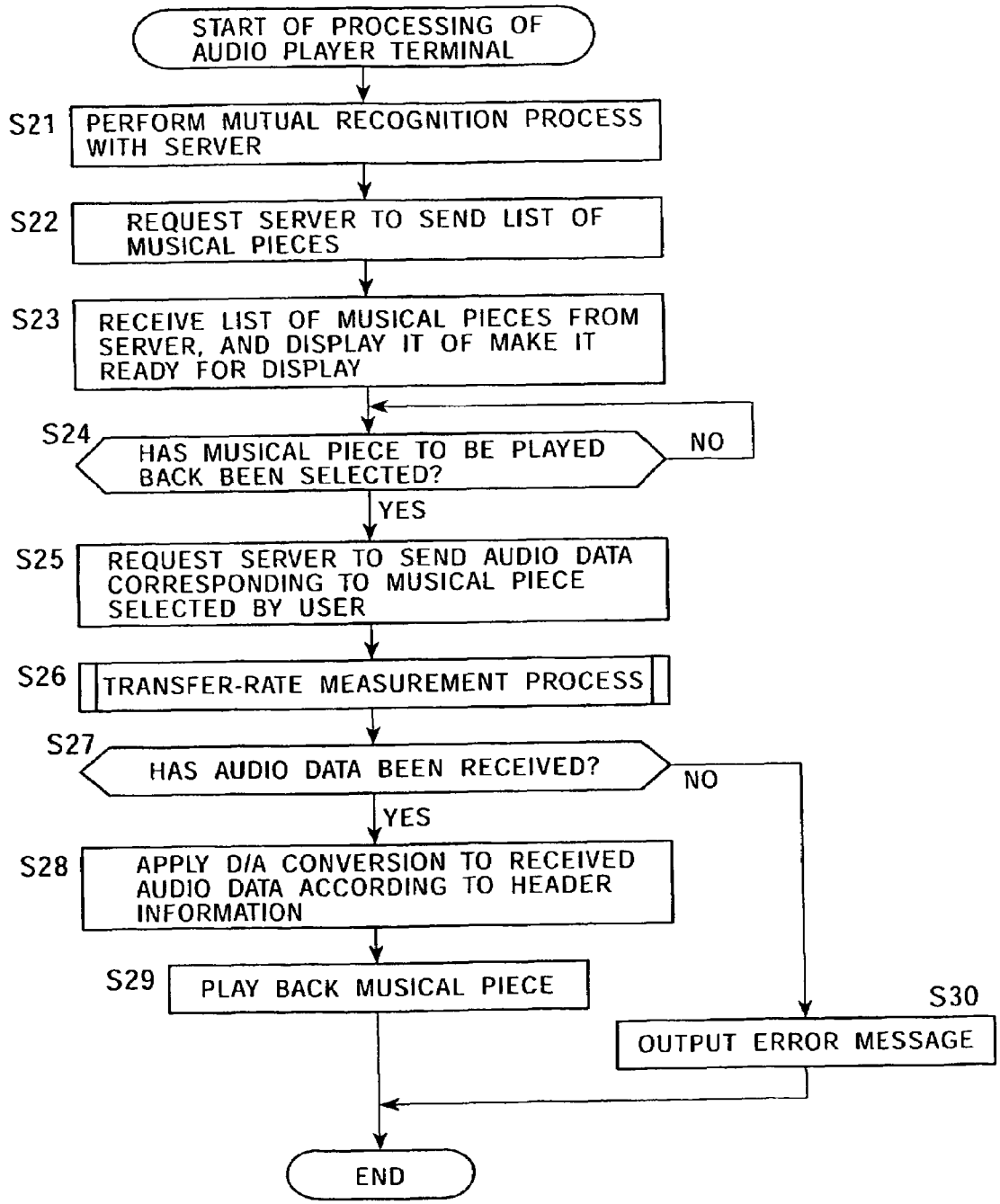
FIG. 4 is a flowchart of the processing of the audio player terminal shown in FIG. 2.

In step S23, the control section 61 receives the list of musical pieces sent by the server 41 in step S3 of FIG. 3, through the hub 3 and the communication section 24, and displays it on the display section 22 or stores it in an internal RAM to make the list of musical pieces ready to be displayed on the display section 22 according to a user's operation input at the operation input section 23.

In step S24, the control section 61 determines whether the desired musical piece to be played back has been selected according to the user's operation input at the operation input section 23.

When it is determined in step S24 that the desired musical piece to be played back has not been selected, the process of step S24 is repeated until it is determined that the desired musical piece to be played back has been selected. When it is determined in step S24 that the desired musical piece to be played back has been selected, the processing proceeds to step S25, and the control section 61 generates a signal for requesting the server 41 to send the audio data corresponding to the musical piece selected by the user, and sends the signal to the server 41 through the communication section 24 and the hub 3 in step S25.

In step S26, the transfer-rate measurement process, to be described later by referring to FIG. 5 or FIG. 6, is executed.

In step S27, the control section 61 determines according to the signal input from the communication section 24 whether the audio data sent by the server 41 in step S9 of FIG. 3 has been received through the hub 3.

When it is determined in step S27 that the audio data has been received, the processing proceeds to step S28, and the control section 61 makes the buffer 26 buffer the linear PCM audio data received by the communication section 24 and sequentially output to the D/A conversion section 27. The D/A conversion section 27 applies D/A conversion to the input linear PCM data according to the header information of the musical data to generate analog audio data.

More specifically, the D/A conversion section 27 extracts the sampling frequency and the number of quantization bits of the data from the header information of the input linear PCM data, and executes D/A conversion according to the extracted information.

In step S29, the control section 61 makes the D/A conversion section 27 output the analog audio data to the speaker 28 to play back the musical piece, and the processing is terminated.

When it is determined in step S27 that the audio data has not been received, the processing proceeds to step S30, the control section 61 outputs the error message sent by the server 41 in step S10 of FIG. 3 and received by the communication section 24 to the display section 22, and makes the display section 22 display the error message, and the processing is terminated.

As described above, the audio player terminal 42 receives not-compressed linear PCM audio data, and play back the corresponding musical piece.

A transfer-rate measurement process 1 executed in step S5 of FIG. 3 and in step S26 of FIG. 4 will be described next by referring to a flowchart shown in FIG. 5.

In step S51, the control section 61 of the audio player terminal 42 sends transfer-rate-measurement data having a predetermined amount to the server 41 through the communication section 24 and the hub 3.

In step S52, the control section 51 of the server 41 activates an internal timer at timing when the audio player terminal 42 sends the data in step S51. It has been assumed that the process executed by the control section 61 of the audio player terminal 42 and that executed by the control section 51 of the server 41 are synchronized. If they are not correctly synchronized, it is necessary for the control section 61 of the audio player terminal 42 and the control section 51 of the server 41 to adjust their internal timers to have the same time before the process of step S51.

In step S53, the control section 51 of the server 41 receives the transfer-rate-measurement data sent by the audio player terminal 42 in step S51, through the hub 3 and the communication section 12, and measures the transmission time by referring to the internal timer activated in step S52.

The system may be configured such that the control section 61 of the audio player terminal 42 records a transmission start time in the header of the data-transfer-rate-measurement data, and the control section 51 of the server 41 calculates the data transmission time from the transmission start time recorded in the header of the received data and a receiving completion time.

In step S54, the control section 51 of the server 41 calculates a transfer rate from the amount of the transfer-rate-measurement data received in step S53 and the transmission time. When the amount of the transfer-rate-measurement data is 1 megabytes, that is, eight megabits, and the transfer time is four seconds, for example, the transfer rate is 2 Mbps.

The control section 51 of the server 41 compares in step S55 the actual transfer rate calculated in step S54 with a predetermined threshold, and determines in step S56 whether the audio data is allowed to be transmitted. The processing returns to step S6 of FIG. 3 and to step S27 of FIG. 4.

When the threshold is 352.8 Kbps and the calculated actual transfer rate is 1 Mbps, for example, it is determined that the audio data is allowed to be transmitted.

When the calculated actual transfer rate is 250 Kbps, it is determined that the audio data is not allowed to be transmitted.

With the process described by referring to FIG. 5, the transfer rate between the server 41 and the audio player terminal 42 is measured, and whether data is allowed to be transmitted is determined.

In the transfer-rate measurement process 1 described by referring to FIG. 5, the audio player terminal 42 sends the predetermined amount of data to the server 41, the server 41 measures the transfer rate, and whether linear PCM data is allowed to be transmitted is determined. The system may be configured such that the server 41 sends the predetermined amount of data to the audio player terminal 42, the audio player terminal 42 calculates the transfer rate, the audio player terminal 42 sends the calculation result to the server 41, and the server 41 recognizes the transfer rate.

A transfer-rate measurement process 2 executed in step S5 of FIG. 3 and in step S26 of FIG. 4 will be described next by referring to FIG. 6.

In step S71, the control section 51 of the server 41 sends a predetermined amount of transfer-rate-measurement data to the audio player terminal 42 through the communication section 12 and the hub 3.

In step S72, the control section 61 of the audio player terminal 42 activates an internal timer at timing when the server 41 sends the data in step S71. It has also been assumed that the process executed by the control section 61 of the audio player terminal 42 and that executed by the control section 51 of the server 41 are synchronized. If they are not correctly synchronized, it is necessary for the control section 61 of the audio player terminal 42 and the control section 51 of the server 41 to adjust their internal timers to have the same time before the process of step S71.

In step S73, the control section 61 of the audio player terminal 42 receives the transfer-rate-measurement data sent by the server 41 in step S71, through the hub 3 and the communication section 24, and measures the transmission time by referring to the internal timer activated in step S72.

The system may be configured such that the control section 51 of the server 41 records a transmission start time in the header of the data-transfer-rate-measurement data, and the control section 61 of the audio player terminal 42 calculates the data transmission time from the transmission start time recorded in the header of the received data and a receiving completion time.

In step S74, the control section 61 of the audio player terminal 42 calculates the transfer rate from the amount of the transfer-rate-measurement data received in step S73 and the transmission time. The same method as that described in step S54 of FIG. 5 is used for calculating the transfer rate.

In step S75, the control section 61 of the audio player terminal 42 sends the transfer rate calculated in step S74 to the server 41 through the communication section 24 and the hub 3.

The control section 51 of the server 41 receives in step S76 the measured transfer rate sent by the audio player terminal 42 in step S75, and compares in step S77 the transfer rate received in step S76 with a predetermined threshold.

In step S78, the control section 51 of the server 41 determines according to the comparison result obtained in step S77 whether the audio data is allowed to be transmitted. The processing returns to step S6 of FIG. 3 and to step S27 of FIG. 4.

With the process described by referring to FIG. 5 or FIG. 6, the data transfer rate between the server 41 and the audio player terminal 42 is measured, and whether the server 41 sends the linear PCM data to the audio player terminal 42 is determined according to the measured transfer rate.

Since the server 41 sends linear PCM data to the audio player terminal 42 in the data transmission method according to the present invention, the above-described transfer-rate measurement process 2 basically needs to be performed. When the transfer-rate measurement process 1 is used, the audio player terminal has a light processing load.

The transfer-rate measurement methods are not limited to those described above. The transfer-rate measurement processes 1 and 2 may be alternately performed. The system may be configured such that the server 41 sends measurement data to the audio player terminal 42, the audio player terminal 42 sends back the measurement data to the server 41 immediately after receiving the data, and the server 41 measures the transmission time.

With the above-described processes, the server 41 determines whether not-compressed audio data requested by the audio player terminal is allowed to be transmitted. In addition, when the corresponding compressed audio data is decoded, since the server 41 determines the sampling frequency or the number of quantization bits of decoded linear PCM data according to the transfer rate measured by the process described by referring to FIG. 5 or FIG. 6, the linear PCM data is suited to the transfer rate and transmitted. Therefore, even when the audio player terminal 42 receives audio-data stream distribution and sequentially plays back the sound, the sound is prevented from being intermittent at the middle.

In the above-described processes, musical-piece data is distributed. The present invention can also be applied to the transmission and receiving of any types of data other than musical-piece data.

With the use of the present invention, image data and moving image data can be transmitted. In addition, data formed of moving images and video can also be transmitted. When data to be distributed by the server 41 includes moving image data, for example, it is necessary to provide a receiving-side unit with a function for reproducing and outputting moving images, or to make the receiving-side unit send the received moving image data to another apparatus which can reproduce moving images. With this, moving images, or data formed of moving images and video is more smoothly stream-distributed.

In the above description, the transfer rate is measured, and it is determined according to the measurement result whether not-compressed data, such as linear PCM data, is allowed to be transmitted. Whether data is allowed to be transmitted may be determined according to the connection state between the server 41 and the audio player terminal 42, recognized in the mutual recognition process executed in step S1 of FIG. 3 and in step S21 of FIG. 4, without measuring the transfer rate.

In other words, when the server 41 and the audio player terminal 42 are connected to the same network, and a certain data transfer rate is assured in the network, whether linear PCM data is allowed to be transmitted can be determined according to whether the server 41 and the audio player terminal 42 are currently in the same network, without measuring the transfer rate.

When the network is configured by IPv4, whether the server 41 and the audio player terminal 42 are connected to the same network is determined by whether the network sections of their IP addresses are the same. When the network is configured by IPv6, whether the server 41 and the audio player terminal 42 are connected to the same network is determined by whether their addresses fall in a link-local-address range or in a site-local-address range.

When a terminal having a radio communication capability detects the nearest server and performs communications, such as in a case in which a portable telephone detects a base station, it is generally determined that units which are located in a range in which a home router which controls unit connections can detect the presence of units are connected to the same network. In this case, when the server 41 and the audio player terminal 42 are located in a predetermined range in which the router 4 or the hub 3, which functions as an access point of the radio LAN, can detect them, it can be said that they are connected to the same network.

When the server 41 and the audio player terminal 42 are connected to a network formed of a plurality of segments, although they are connected to the same network, a transfer rate sufficient for transmitting linear PCM data is not assured. When a transfer rate sufficient for transmitting linear PCM data is assured if the server 41 and the audio player terminal 42 are in the same segment, whether linear PCM data is allowed to be transmitted may be determined by whether the server 41 and the audio player terminal 42 exist in the same segment.

When the network is configured by IPv4, whether the server 41 and the audio player terminal 42 are connected to the same network is determined by whether the network sections of their IP addresses belong to the same private-address range. When the network is configured by IPv6, whether the server 41 and the audio player terminal 42 belong to the same segment is determined by whether their addresses fall in a site-local-address range.

Whether the server 41 and the audio player terminal 42 are connected to the same network (or to the same segment) may be determined by the server 41. Alternatively, it is determined by the audio player terminal 42 and the audio player terminal 42 sends the result to the server 41.

When whether linear PCM data is allowed to be transmitted and received can be determined by whether the server 41 and the audio player terminal 42 are connected to the same network or to the same segment, sound is prevented from being intermittent and from being skipped when the audio player terminal 42 receives the linear PCM data and reproduces it, without measuring the data transfer rate.

Linear PCM data may be transmitted and received only when it is determined whether the server 41 and the audio player terminal 42 are connected to the same network or to the same segment, and further the transfer rate is measured to confirm that the server 41 and the audio player terminal 42 are connected to the same network or to the same segment, and the transfer rate is equal to or higher than a predetermined transfer rate.

The system may be configured such that it is determined whether the server 41 and the audio player terminal 42 are connected to the same network or to the same segment to determine whether linear PCM data is allowed to be transmitted and received; when linear PCM data is allowed to be transmitted and received, the transfer rate is further measured; then, linear PCM data having a sampling frequency and the number of quantization bits both suited to the transfer rate is generated and transmitted and received.

The above-described series of processes can be executed not only by hardware or but also by software. In this case, for example, the server 41 or the audio player terminal 42 is formed of a personal computer 91 such as that shown in FIG. 7. In addition, the processing executed by the audio player terminal 42 can be performed by using, for example, a personal digital (data) assistance (PDA), a portable telephone, or a portable audio player apparatus.

In FIG. 7, a CPU 111 executes various types of processes according to a program stored in a ROM 112 or a program loaded from a storage section 118 to a RAM 113. The RAM 113 also stores data required for the various types of processes executed by the CPU 111, if necessary.

The CPU 111, the ROM 112, and the RAM 113 are connected to each other through a bus 114. The bus 114 is also connected to an input-and-output interface 115.

The input-and-output interface 115 is connected to an input section 116 formed of a keyboard, a mouse, and others, to an output section 117 formed of a display, a speaker, and others, to the storage section 118 formed of a hard disk and others, and to a communication section 119 formed of a modem, a terminal adapter, and others. The communication section 119 performs a communication process through networks, including the Internet.

The input-and-output interface 115 is also connected to a drive 120, if necessary. A magnetic disk 131, an optical disk 132, a magneto-optical disk 133, or a semiconductor memory 134 is mounted to the drive 120, if necessary, and a computer program read therefrom is installed into the storage section 118, if necessary.

When the series of processes is executed by software, a program constituting the software is installed through a network or from a recording medium into a computer which is built in special hardware or into a unit which can execute various functions by installing various types of programs, such as a general-purpose personal computer.

The recording medium is formed of a package medium storing the program and distributed to the user for providing the program separately from an apparatus, such as the magnetic disk (including a floppy disk) 131, the optical disk (including a compact disk read only memory (CD-ROM) and a digital versatile disk (DVD)) 132, the magneto-optical disk (including a Mini-Disc (MD, trademark)) 133, or the semiconductor memory 134, as shown in FIG. 7. Alternatively, the recording medium is formed of a device assembled in an apparatus in advance and distributed to the user, such as the ROM 112 which stores the program or a hard disk included in the storage section 118.

In the present specification, steps describing the program stored in the recording medium include not only processes performed time-sequentially in the order of descriptions but also processes not necessarily performed time-sequentially but performed in parallel or separately.

In the present specification, a system refers to the entire structure formed of a plurality of apparatuses.

What is claimed is:

1. An information processing method for stream-distributing data from an information processing apparatus to an information processing terminal, comprising steps of:
   receiving, from the information processing terminal, a first request of sending a list of titles of data;
   in response to the first request, sending the list of titles of data to the information processing terminal;
   receiving, from the information processing terminal, a second request of sending selected data selected by a user from the list of titles of data by selecting at least a title of the selected data;
   in response to the second request of sending the selected data, determining a data transfer rate of data transferred between the information processing apparatus and the information processing terminal;
   determining, based on the determined data transfer rate, whether the selected data is allowed to be stream-distributed to the information processing terminal;
   when it is determined that the selected data is allowed to be stream-distributed, down-sampling the selected data to obtain down-sampled selected data so that the down-sampled selected data has a number of quantization bits and a sampling frequency determined according to the determined data transfer rate, wherein a product of the sampling frequency and the number of quantization bits of the down-sampled selected data is below the determined data transfer rate of data transferred between the information processing apparatus and the information processing terminal, and stream-distributing the down-sampled selected data to the information processing terminal; and
   when it is determined that the selected data is not allowed to be stream-distributed, sending an error message to the information processing terminal.

2. The information processing method of claim 1, wherein the selected data comprises compressed data, further comprising steps of:
   reading the compressed data; and
   decompressing the compressed data to generate decompressed data in accordance with the determined data transfer rate, wherein the decompressed data is suitable to be stream-distributed to the information processing terminal.

3. The information processing method of claim 1, wherein the list of titles of data comprises a list of titles of a plurality of musical pieces.

4. [[The]] An information processing apparatus configured to stream-distribute data to an information processing terminal, comprising:
   a determination element configured to perform acts of:
      receiving, from the information processing terminal, a first request of sending a data list;
      in response to the first request, sending the data list to the information processing terminal;
      receiving, from the information processing terminal, a second request of sending selected data selected by a user from the data list;
      in response to the second request, determining a data transfer rate of data transferred between the information processing apparatus and the information processing terminal; and
      determining, based on the determined data transfer rate, whether the selected data is allowed to be stream-distributed to the information processing terminal; and a transmission element configured to perform acts of:

when it is determined that the selcted data is allowed to be stream-distributed, down-sampling the selected data to obtain down-sampled selected data so that the down-sampled selected data has a number of quantization bits and a sampling frequency determined according to the determined data transfer rate, wherein a product of the sampling frequency and the number of quantization bits fo the down-sampled selcted data is below the determined data transfer rate of data transferred between the information processing apparatus and the information processing terminal, and stream-distributing the down-sampled selected data to the information processing terminal; and when it is determined that the selected data is allowed to be stream-distributed, sending an error message to the information processing terminal.

5. The information processing apparatus of claim 4, wherein the selected data comprises compressed data, further comprising a data decompression element configured to perform acts of:

reading the compressed data; and decoding the compressed data to generate decompressed data in accordance with the determined data transfer rate, wherein the decompressed data is suitable to be stream-distributed to the information processing terminal.

6. At least one computer-readable medium having stored thereon computer-executable instructions that, when executed by a processor, perform a method for stream-distributing data from an information processing apparatus to an information processing terminal, the method comprising:

receiving, from the information processing terminal, a first request of sending a list of titles of data;

in response to the first request, sending the list of titles of data to the information processing terminal;

receiving, from the information processing terminal, a second request of sending selected data selected by a user from the list of titles of data by selecting at least a title of the selected data;

in response to the second request, determining a data transfer rate of data transferred between the information processing apparatus and the information processing terminal;

determining, based on the determined data transfer rate, whether the selected data is allowed to be stream-distributed to the information processing terminal;

when it is determined that the selected data is allowed to be stream-distributed, down-sampling the selected data to obtain down-sampled selected data so that the down-sampled selected data has a number of quantization bits and a sampling frequency determined according to the determined data transfer rate, wherein a product of the sampling frequency and the number of quantization bits of the down-sampled selected data is below the determined data transfer rate of the data transferred between the information processing apparatus and the information processing terminal, and stream-distributing the down-sampled selected data to the information processing terminal; and when it is determined that the selected data is not allowed to be stream-distributed, sending an error message to the information processing terminal.

7. An information processing method for receiving data stream-distributed from an information processing apparatus to an information processing terminal, comprising:

sending a first signal of requesting the information processing apparatus to send a data list;

receiving the data list from the information processing apparatus;

determining that selected data to be reproduced has been selected from the data list;

sending a second signal of requesting the information processing apparatus to send the selected data;

determining a data transfer rate of data transferred between the information processing apparatus and the information processing terminal, wherein the determined data transfer rate is used to determine a number of quantization bits and a sampling frequency for down-sampling the selected data to obtain down-sampled selected data, wherein a product of the sampling frequency and the number of quantization bits of the down-sampled selected data is below the determined data transfer rate of the data transferred between the information processing apparatus and the information processing terminal;

determining whether the down-sampled selected data sent by the information processing apparatus has been received;

when it determined that the down-sampled selected data sent by the information processing apparatus has been received, reproducing the received down-sampled selected data; and when it determined that the down-sampled selected data sent by the information processing apparatus has not been received, receiving an error message from the information processing apparatus.

8. The information processing method of claim 7, further comprising:

displaying the data list; and receiving an input from a user to select the selected data from the displayed data list.

9. The information processing method of claim 7, further comprising displaying the received error message.

10. The information processing method of claim 9, when it determined that the down-sampled selected data sent by the information processing apparatus has been received, further comprising:

executing a digital-to-analog conversion of the down-sampled selected data in accordance with a header information of the down-sampled selected data to generate analog data; and reproducing the analog data.

11. An information processing terminal for receiving and reproducing data stream-distributed by an information processing apparatus, the information processing terminal configured to perform acts of:

sending, by a transmission element, a first signal of requesting the information processing apparatus to send a data list;

receiving, by a first receiving element, the data list from the information processing apparatus;

determining that data to be reproduced has been selected from the data list;

sending, by the transmission element, a second signal of requesting the information processing apparatus to send the selected data;

determining, by a determination element, a data transfer rate of data transferred between the information processing apparatus and the information processing terminal, wherein the determined data transfer rate is used to determine a number of quantization bits and a sampling frequency for down-sampling the selected data to obtain down-sampled selected data, wherein a product of the sampling frequency and the number of quantization bits of the down-sampled selected data is below the determined data transfer rate of the data transferred between the information processing apparatus and the information processing terminal;

determining whether the down-sampled selected data sent by the information processing apparatus has been received;

when it determined that the down-sampled selected data sent by the information processing apparatus has been received, reproducing, by a reproduction element, the received down-sampled selected data; and when it determined that the down-sampled selected data sent by the information processing apparatus has not been received, receiving, by a second receiving element, an error message from the information processing apparatus.

12. The information processing terminal of claim 11, further comprising a display element configured to:
   display the data list; and
   receive an input from a user to select data from the displayed data list.

13. The information processing terminal of claim 12, wherein the display element is configured to display the error message.

14. The information processing terminal of claim 11, further comprising a digital-to-analog conversion element configured to execute a digital-to-analog conversion of the received down-sampled selected data in accordance with a header information of the received down-sampled selected data to generate analog data, wherein the reproduction element is configured to reproduce the analog data.

15. At least one computer-readable medium having stored thereon computer-executable instructions that, when executed by a processor, perform a method for receiving and reproducing data stream-distributed by an information processing apparatus, the method comprising:

sending a first signal of requesting the information processing apparatus to send a data list;

receiving the data list from the information processing apparatus;

determining that data to be reproduced has been selected from the data list;

sending a second signal of requesting the information processing apparatus to send the selected data;

before receiving the selected data from the information processing apparatus, determining a data transfer rate of data transferred between the information processing apparatus and the information processing terminal, wherein the determined data transfer rate is used to determine a number of quantization bits and a sampling frequency for down-sampling the selected data to obtain down-sampled selected data, and wherein a product of the sampling frequency and the number of quantization bits of the down-sampled selected data is below the determined data transfer rate of the data transferred between the information processing apparatus and the information processing terminal;

determining whether the down-sampled selected data sent by the information processing apparatus has been received;

when it determined that the down-sampled selected data sent by the information processing apparatus has been received, reproducing the received down-sampled selected data; and when it determined that the down-sampled selected data sent by the information processing apparatus has not been received, receiving an error message from the information processing apparatus.

16. An information processing system comprising an information processing terminal and an information processing apparatus, wherein the information processing apparatus stream-distributes data to the information processing terminal and the information processing terminal receives and reproduces the stream-distributed data, wherein the information processing terminal is configured to perform acts of:

sending, by a transmission element, a first signal of requesting the information processing apparatus to send a data list;

receiving, by a first receiving element, the data list from the information processing apparatus;

determining that data to be reproduced has been selected from the data list;

sending, by the transmission element, a second signal of requesting the information processing apparatus to send the selected data;

determining, by a determination element, a data transfer rate of data transferred between the information processing apparatus and the information processing terminal, wherein the determined data transfer rate is used to determine a number of quantization bits and a sampling frequency for down-sampling the selected data to obtain down-sampled selected data, wherein a product of the sampling frequency and the number of quantization bits of the down-sampled selected data is below the determined data transfer rate of the data transferred between the information processing apparatus and the information processing terminal;

determining whether the down-sampled selected data sent by the information processing apparatus has been received;

when it determined that the down-sampled selected data sent by the information processing apparatus has been received, reproducing, by a reproduction element, the received down-sampled selected data; and when it determined that the down-sampled selected data sent by the information processing apparatus has not been received, receiving, by a second receiving element, an error message from the information processing apparatus; and wherein the information processing apparatus comprises:

a determination element configured to perform acts of:

receiving the first signal of requesting the information processing apparatus to send a data list;

in response to the first request, sending the data list to the information processing terminal;

receiving the second signal of requesting the information processing apparatus to send the selected data;

in response to the second signal, determining the data transfer rate of the data transferred between the information processing apparatus and the information processing terminal; and determining, based on the determined data transfer rate, whether the selected data is allowed to be stream-distributed to the information processing terminal; and a transmission element configured to perform acts of:
- when it is determined that the selected data is allowed to be stream-distributed, stream-distributing the down-sampled selected data to the information processing terminal; and
- when it is determined that the selected data is not allowed to be stream-distributed, sending the error message to the information processing terminal.

17. The at least one computer-readable medium of claim 15, wherein determining the data transfer rate of the data transferred between the information processing apparatus and the information processing terminal comprises:
- receiving a predetermined amount of transfer-rate-measurement data sent by the information processing apparatus;
- measuring a time of transmission of the received transfer-rate-measurement data using an internal timer; and
- determining the data transfer rate from the predetermined amount of the received transfer-rate-measurement data and the time of transmission.

* * * * *